(12) United States Patent  (10) Patent No.: US 8,211,518 B2
Fernandes et al.  (45) Date of Patent: Jul. 3, 2012

(54) DUCT SECTION, SYSTEM AND METHOD FOR CONSTRUCTING SAME

(75) Inventors: Leslie Fernandes, La Canada, CA (US); Arnaud Amy, Creteil (FR)

(73) Assignee: Senior Operations Inc., Bartlett, IL (US)

( * ) Notice: Subject to any disclaimer, the term of this patent is extended or adjusted under 35 U.S.C. 154(b) by 798 days.

(21) Appl. No.: 12/024,093

(22) Filed: Jan. 31, 2008

(65) Prior Publication Data

US 2010/0037974 A1    Feb. 18, 2010

Related U.S. Application Data

(63) Continuation-in-part of application No. 11/700,797, filed on Jan. 31, 2007.

(51) Int. Cl.
*B32B 1/08* (2006.01)
*B32B 23/00* (2006.01)

(52) U.S. Cl. ............ 428/36.1; 428/34.1; 428/34.2; 428/35.7; 428/35.9; 428/36.9

(58) Field of Classification Search ............ 428/34.1, 428/34.2, 35.7, 35.9, 36.1, 36.9
See application file for complete search history.

(56) References Cited

U.S. PATENT DOCUMENTS

| | | |
|---|---|---|
| 2,226,523 A | 12/1940 | Peck |
| 2,525,644 A | 10/1950 | Brunson |
| 2,861,598 A | 11/1958 | Carder, Jr. et al. |
| 3,434,502 A | 3/1969 | Snelling |
| 3,558,391 A * | 1/1971 | Peyton et al. ............ 156/171 |
| 3,911,961 A | 10/1975 | Peyton et al. |
| 4,020,875 A | 5/1977 | Akiba |
| 4,071,048 A | 1/1978 | Watase |
| 4,316,072 A | 2/1982 | Arnoldt |
| 4,428,789 A | 1/1984 | Masaaki et al. |
| 4,615,359 A | 10/1986 | Affa et al. |
| 4,657,049 A | 4/1987 | Fourty et al. |
| 4,691,741 A * | 9/1987 | Affa et al. ............ 138/113 |
| 4,934,412 A | 6/1990 | Fischer et al. |
| 5,300,336 A | 4/1994 | Wong et al. |
| 5,549,942 A | 8/1996 | Watts |
| 5,915,421 A | 6/1999 | Borzym et al. |

(Continued)

FOREIGN PATENT DOCUMENTS

GB    2 315 835    7/1997

(Continued)

OTHER PUBLICATIONS

International Preliminary Report on Patentability from International Bureau of WIP for PCT/US2009/000644.

(Continued)

*Primary Examiner* — Marc Patterson
(74) *Attorney, Agent, or Firm* — Greenberg Traurig LLP

(57) ABSTRACT

A duct section and system, including a laminated shroud, acting as a secondary duct, for aerospace and other applications, and a method for constructing same. The duct structure incorporates a metallic primary duct tube, with a laminated shroud surrounding the primary duct tube and separated therefrom by an annular gap. The laminated shroud includes a metallic inner layer and a polymeric outer layer. Preferably, the thin metallic layer is a corrosion resistant material such as corrosion resistant stainless steel or titanium. In one embodiment of the invention, the outer polymeric layer is a polyimide material, such as polyimide resin-impregnated fiberglass cloth.

11 Claims, 6 Drawing Sheets

U.S. PATENT DOCUMENTS

| | | | |
|---|---|---|---|
| 5,972,450 A | 10/1999 | Hsich et al. | |
| 6,027,794 A * | 2/2000 | Ozaki et al. | 428/297.7 |
| 6,589,617 B2 | 7/2003 | Hsich et al. | |
| 7,047,615 B2 | 5/2006 | Norek | |
| 7,112,054 B2 | 9/2006 | Frantz et al. | |
| 2004/0026015 A1 | 2/2004 | Frantz et al. | |
| 2006/0137431 A1 | 6/2006 | Fernandes et al. | |
| 2006/0180227 A1 | 8/2006 | Hummel et al. | |

FOREIGN PATENT DOCUMENTS

| | | |
|---|---|---|
| JP | 02155933 A | 6/1990 |
| JP | 06159586 | 6/1994 |
| JP | 071198195 | 8/1995 |
| RU | 2182868 C1 | 5/2002 |

OTHER PUBLICATIONS

Extended Search Report for EP 09734810.6, Issued Nov. 7, 2011.

* cited by examiner

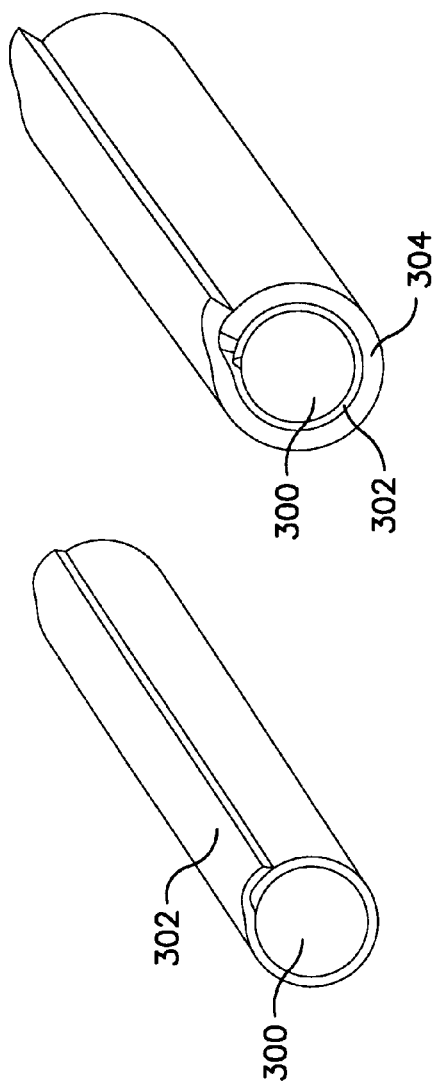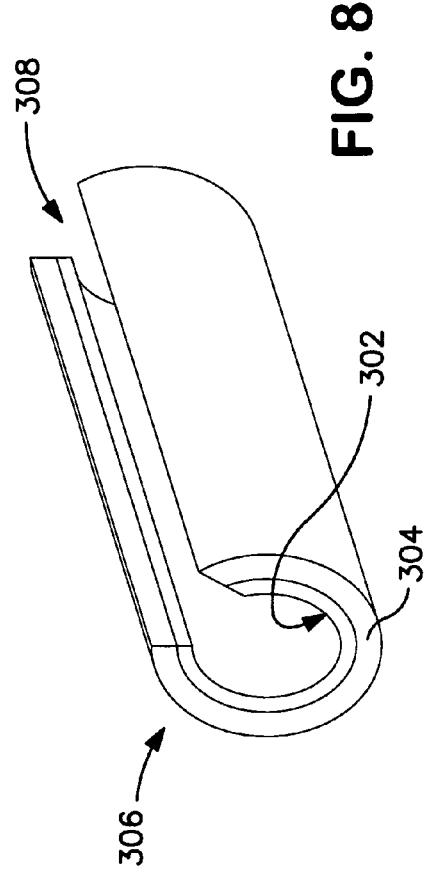

DUCT SECTION, SYSTEM AND METHOD FOR CONSTRUCTING SAME

This application is a continuation-in-part of, and claims priority of the filing date of, U.S. Ser. No. 11/700,797, filed 31 Jan. 2007 and presently pending.

BACKGROUND OF THE INVENTION

Field of the Invention

The present invention relates in general to ducting structures for use in aircraft, and methods for making same.

By way of example, ducts are employed in aircraft to carry bleed air from the engines, particularly turbine engines, to provide heated pressurized air, to provide cabin pressurization and cabin environmental control and for deicing leading and/or trailing edges and/or other surfaces of the wings of the aircraft. Such ducts must be able to withstand internal temperatures of 800° F. or more, while exposing surrounding structures in the interior of the aircraft to temperatures of no more than 400° F., to prevent inflicting damage to such surrounding structures. Furthermore, such ducts must be able to withstand, for extended periods of time, duct gauge pressures greater than ambient air pressure, of as much as 60 psig.

Such ducts have been known to be insulated by wrapping the single metal duct tube with an insulation arrangement consisting of an insulation "blanket" such as those known in the art as "E-felt", "Q-fiber", or "Min-K" or with a similar thermal blanket, which is then covered with a silicone rubber-impregnated fiberglass cloth cover.

Such an insulation construction is neither intended, nor capable of functioning as either a load-bearing arrangement, or for containment of the heated, pressurized gases flowing through the duct, should the duct develop a breach. In addition, as such an insulation arrangement is typically not tightly affixed to the underlying duct, it is possible for the insulation to rotate about the duct during use in service. In service applications in which duct leak detection systems are employed, in which a sensor may be placed over an intentionally provided aperture or void in the insulation, rotation of the insulation can lead to misdirection of leaking gases, thus causing missed detection of such leaks.

SUMMARY OF THE INVENTION

The present invention comprises, in an embodiment, a duct section, for conducting gaseous fluid from a first location to a second location. The duct section may include a primary duct member, having a first end and a second end; and a multilayer shroud, having a first end and a second end, circumferentially surrounding at least a portion of the primary duct member. The first end of the primary duct member may be disposed proximate the first end of the multilayer shroud and the second end of the primary duct member being disposed proximate the second end of the multilayer shroud.

A first closeout collar may be disposed proximate the first ends of the primary duct member and the multilayer shroud, respectively, and affixed thereto. A second closeout collar may be disposed proximate the second ends of the primary duct member and the multilayer shroud, respectively, and affixed thereto.

The shroud has an inner surface and an outer surface, with a metallic inner layer positioned at the inner surface. A polymeric outer layer may be bonded to the outer surface of the metallic inner layer.

The present invention also comprises a duct system for conveying gaseous fluid from a first location to a second location, comprising at least two duct sections, each duct section having a primary duct member, having a first end and a second end; and a multilayer shroud, having a first end and a second end, circumferentially surrounding at least a portion of the primary duct member. The first end of the primary duct member may be disposed proximate the first end of the multilayer shroud and the second end of the primary duct member being disposed proximate the second end of the multilayer shroud.

A first closeout collar may be proximate the first ends of the primary duct member and the multilayer shroud, respectively, and affixed thereto. A second closeout collar may be disposed proximate the second ends of the primary duct member and the multilayer shroud, respectively, and affixed thereto.

The shroud has an inner surface and an outer surface, with a metallic inner layer positioned at the inner surface. A polymeric outer layer may be bonded to the outer surface of the metallic inner layer.

In addition, first and second duct end flanges are affixed to the first and second ends of the primary duct member, with the first and second duct sections being disposed in abutting relationship to one another with a duct end flange of one of the at least two duct sections abutting a duct end flange of another of the at least two duct sections. A clamp engages the abutting duct end flanges, and is affixed thereto, to form a coupling between the one and the another of the at least two duct sections.

The present invention also comprises a method for forming a duct section, for conducting gaseous fluid from a first location to a second location, in which the method comprises the steps of:

providing a primary duct member, having a first end and a second end;

providing a multilayer shroud, having a first end and a second end, circumferentially surrounding at least a portion of the primary duct member;

the first end of the primary duct member being disposed proximate the first end of the multilayer shroud and the second end of the primary duct member being disposed proximate the second end of the multilayer shroud;

providing a first closeout collar disposed proximate the first ends of the primary duct member and the multilayer shroud, respectively, and affixed thereto;

providing a second closeout collar disposed proximate the second ends of the primary duct member and the multilayer shroud, respectively, and affixed thereto;

the step of providing a multilayer shroud further including the steps of providing the shroud with a metallic inner layer; and a polymeric outer layer, bonded to an outer surface of the metallic inner layer.

BRIEF DESCRIPTION OF THE DRAWINGS

FIG. 6 is a perspective schematic view of an alternative method for forming a shroud, showing the step of wrapping a metal layer around a mandrel.

FIG. 7 is a perspective schematic view of the alternative method of FIG. 6, showing the subsequent step of wrapping a polymer layer around the metal layer.

FIG. 8 is a perspective schematic view of the alternative method of FIG. 6, showing the subsequent step of splitting the shroud longitudinally to permit removal from the mandrel and placement on a primary duct member.

DETAILED DESCRIPTION OF THE INVENTION

Figure 1:
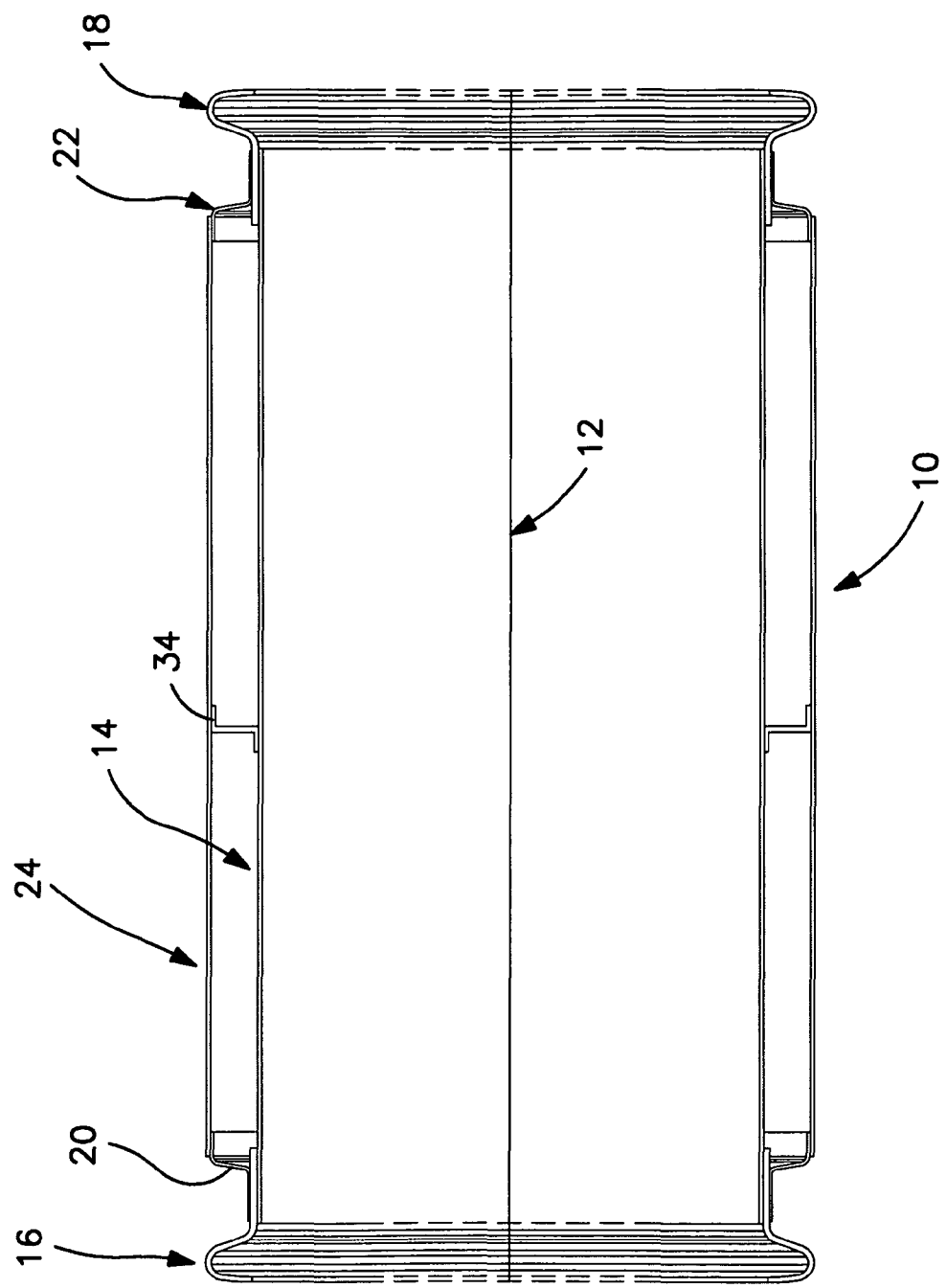
FIG. 1 is a side elevation, in section, of a duct section according to an embodiment of the invention.

While this invention is susceptible of embodiment in many different forms, there is shown in the drawings, and described in detail herein, one embodiment, with the understanding that the present disclosure is to be considered an exemplification of the principles of the invention and is not intended to limit the invention to the embodiment illustrated.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Without intent to limit the scope of the disclosure, exemplary instruments, apparatus, methods and their related results according to the embodiments of the present disclosure are given below. Note that titles or subtitles may be used in the examples for convenience of a reader, which in no way should limit the scope of the invention. Moreover, certain theories may be proposed and disclosed herein; however, in no way, whether they are right or wrong, should they limit the scope of the disclosure so long as the disclosure is practiced according to the disclosure without regard for any particular theory or scheme of action Unless otherwise defined, all technical and scientific terms used herein have the same meaning as commonly understood by one of ordinary skill in the art to which this disclosure pertains. In the case of conflict, the present document, including definitions will control.

The term "proximate" shall mean at or near the object being modified by the term "proximate". Any numerical values provided herein are given by way of example and the scope of the claimed invention is not intended to be limited in any way thereby.

The present invention comprises, in part, a duct structure for carrying gases which may be at temperatures and pressures greater than standard sea level temperature and pressure. Such ducts may find use in aerospace applications, such as deicing ducts, particularly those having bleed leak detection structures, as well as in other aerospace and non-aerospace applications.

Duct section 10 according to an embodiment of the invention is shown in FIG. 1. Duct section 10 is preferably a body of rotation, substantially if not completely radially symmetrical about longitudinal axis 12.

Duct section 10 includes cylindrical primary duct member 14, which may be fabricated from corrosion-resistant steel (e.g., CRES 321), commercially pure or alloyed titanium, nickel alloys (e.g. Inconel 625, Inconel 718) or any other similar, temperature and pressure-resistant materials. Duct end flanges 16, 18 are affixed, such as by welding or brazing, to the ends of primary duct member 14; specifically, to the outer surfaces of the ends of primary duct member 14, in the embodiment shown in FIG. 1, although duct end flanges 16, 18 could be sized to be inserted into, and affixed to, the inside surfaces of the ends of primary duct member 14, if so desired.

Figure 2:
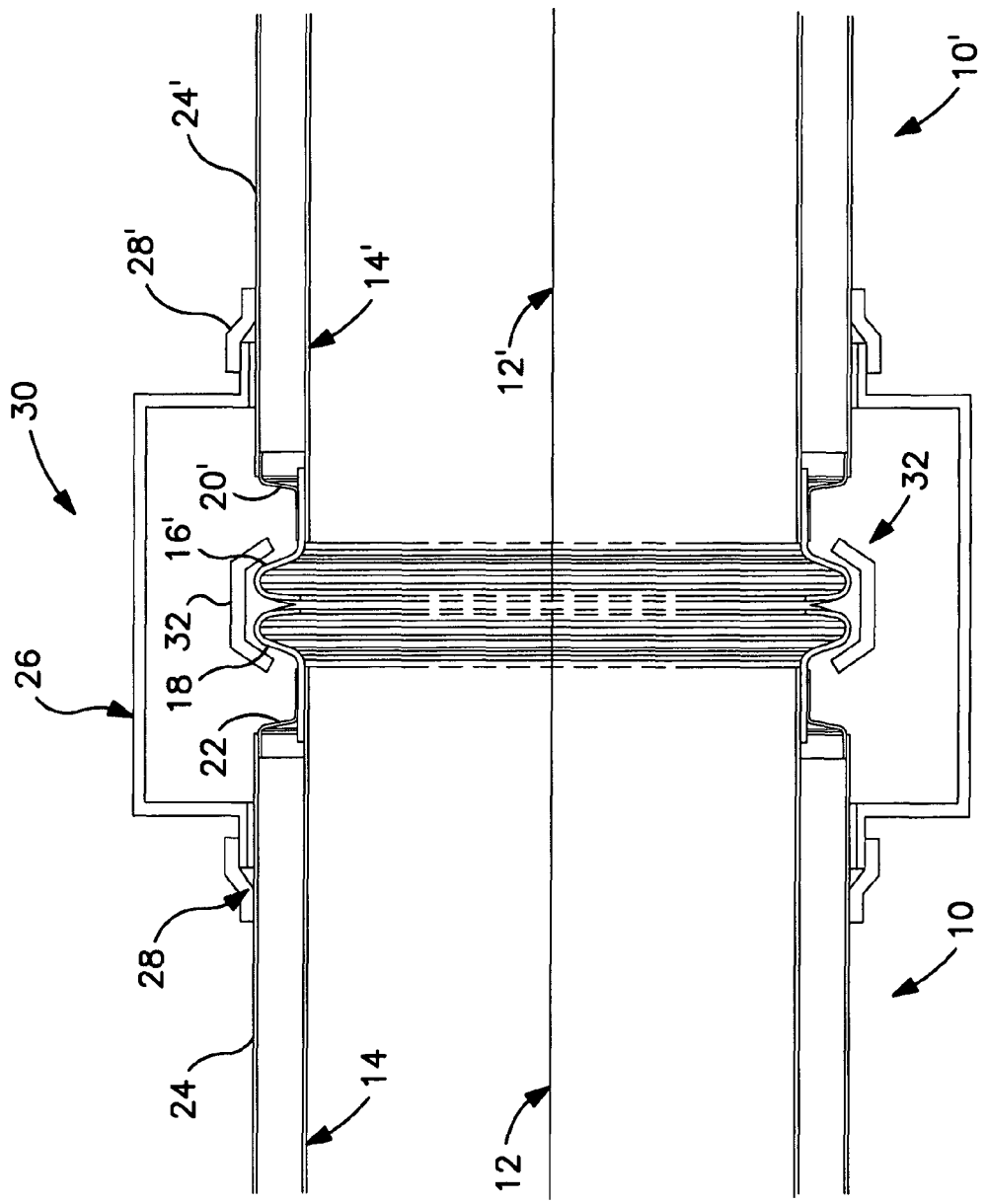
FIG. 2 is a fragmentary side elevation, in section, of two duct sections according to FIG. 1, shown arranged end-to-end, as would be accomplished in a working emplacement of the invention.
Figure 3:
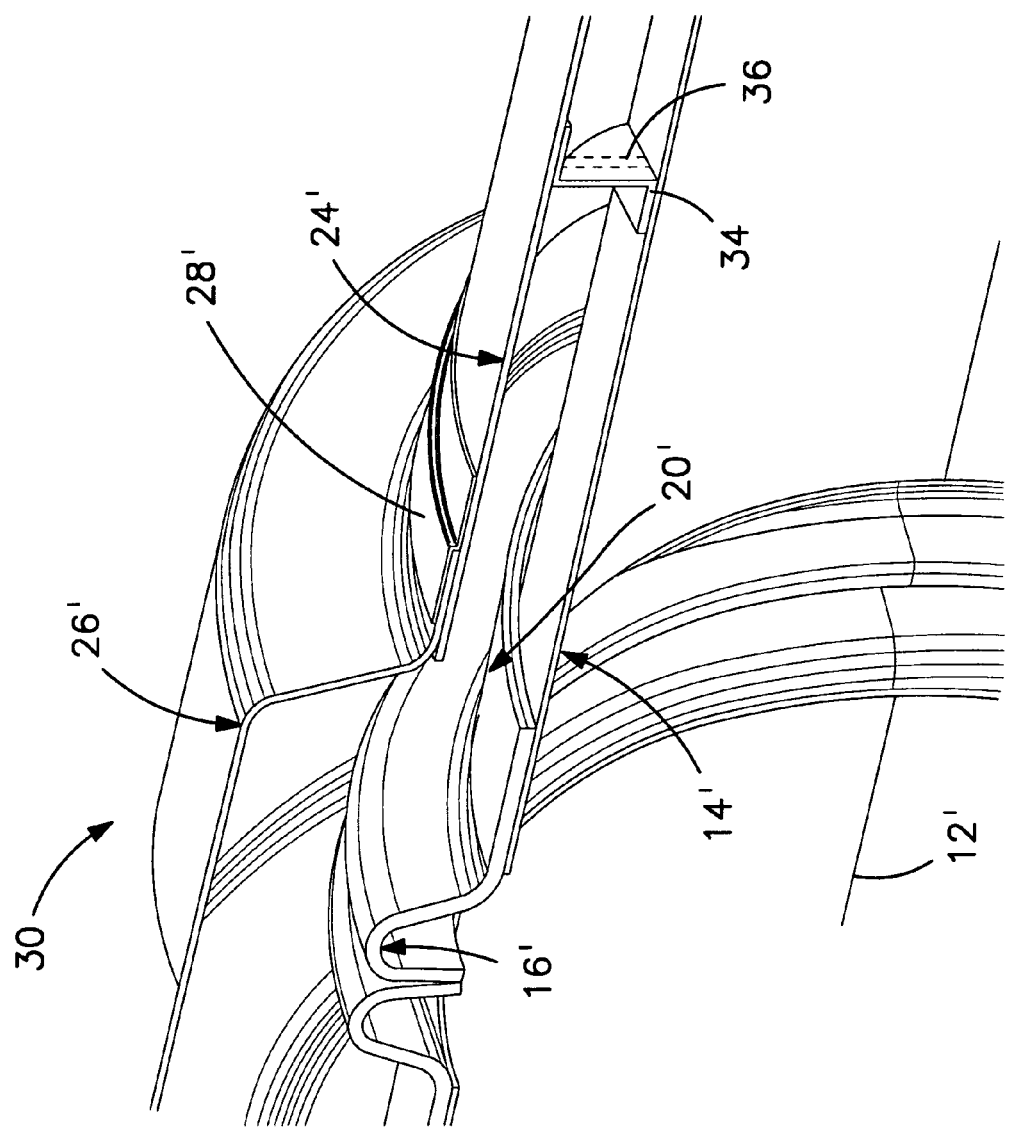
FIG. 3 is a fragmentary enlarged perspective view of the junction between the two duct sections shown in FIG. 2.

In the embodiment shown in FIGS. 1-3, prior to affixation of duct end flanges 16 and 18, closeout collars 20, 22 are positioned upon, and affixed to, the outer surfaces of the portions of duct end flanges 16 and 18, which are directly affixed to the outer surfaces of the ends of primary duct member 14. Again, a permanent method of affixation, such as by welding or brazing may be employed. In an embodiment in which duct end flanges 16 and 18 are inserted into the ends of primary duct member 14, closeout collars 20, 22 may be directly affixed to the outer surfaces of the ends of primary duct member 14. Duct end flanges 16 and 18 may be of any suitable configuration known in the art, that is amenable to provide a coupling connection between two complementary duct end flanges placed in abutting relationship, and secured by a suitable clamping arrangement, as discussed in further detail herein. Further, duct end flanges 16 and 18 may be of any suitable metallic material, such as CRES, commercially pure or alloyed titanium, nickel alloys (e.g. Inconel 625, Inconel 718), etc.

To provide insulation and protection of primary duct member 14, and to serve as a secondary or backup ducting in the event of a failure of primary duct member 14, shroud 24 is provided. Shroud 24 is affixed, at its ends, to radially outwardly positioned portions of closeout collars 20, 22 as shown in FIG. 1. Preferably, shroud 24 is fabricated as a laminate of a relatively thin (foil) inner metal layer and an outer polymer layer, the details of the fabrication of which are discussed in detail with respect to FIGS. 4 and 5 (in an embodiment) and FIGS. 6-8 (in another embodiment) herein. Affixation of shroud 24 to closeout collars 20, 22 is accomplished by strip of the same polymer used in fabricating the laminate of shroud 24, as discussed elsewhere herein.

In an embodiment of the invention, a single ply (one inner layer of metal and one outer layer of polymer material) is provided in shroud 24. In other embodiments of the invention, multiple polymer layers may be provided to enable duct section 10 to withstand pressures greater than the 60 psig noted above. Typically, the metal layer will be a single layer.

To provide an elongated ductwork composed of a plurality of duct sections 10, couplings 30, such as shown in FIGS. 2 and 3 may be provided. In FIGS. 2 and 3, structures which are analogous or identical to structures shown in FIG. 1 are provided with like reference numerals augmented with a prime (').

Coupling 30 is provided by placing duct sections 10, 10' end to end, and then affixing duct end flange 18 to complementary duct end flange 16', through the use of a clamp 32 (shown only at the top and bottom sides of the duct end flanges 18 and 16', of FIG. 2, but understood to fully encircle and axially enclose duct end flanges 18, 16'). Clamps 32 are known in the art and may be provided in many different forms, such as: 1) two semicircular sections which are joined at a hinge on one side, and by a bolt or similar fastening mechanism on the other side; 2) two or more arcuate sections which are joined by bolted connections where their ends meet; 3) two full circular sections which are "divided" along a plane (not shown) extending perpendicular to longitudinal axes 12, 12', etc., and then bolted or otherwise fastened to one another. Upon application and securement of the clamp, a substantially gaseous fluid-tight seal is created between the abutting duct end flanges.

A cover 26, fabricated from a single or multi-layer silicone rubber-impregnated fiberglass cloth, is positioned over the area where duct end flanges 18, 16' abut one another, and secured to outer surfaces of shrouds 24, 24', such as by a silicone-based self-fusing tape (e.g., the tape sold under the trademark MOX-Tape™, marketed by Arlon, Inc.).

Closeout collars 20, 22 may be fabricated from CRES, titanium or any other suitable metallic material. Closeout collars 20, 22 serve to provide support and stiffening for shroud 24, as well as to inhibit rotation of shroud 24 relative to primary duct member 14. In an embodiment of the invention, closeout collars 20, 22 preferably completely close off the annular space of the air gap between each primary duct member 14 and its corresponding shroud 24.

In addition to closeout collars 20, 22, one or more standoffs 34 (FIGS. 1-3) are provided along the length of each duct section (the number of standoffs being dependent at least in part on the length of the given duct section) to provide support for shroud 24 to help maintain proper spacing between primary duct member 14 and shroud 24. In addition, each standoff 34 is provided with a slit, split or other aperture 36 (FIG. 3). In duct sections 10 that may be provided with duct leak detection systems (as discussed in further detail herein, and as described, e.g., in Fernandes et al., U.S. Pat. No. 7,155,961 B2), a detection manifold will be positioned somewhere along the length of the shroud, over either a gap in the shroud or over intentionally placed apertures or vents in the shroud. However, because a breach in a primary duct member may not occur at the same location along the length of the duct section that the manifold is situated, there has to be a pathway for gases escaping from a breach in the primary duct member to get to the aperture or gap in the shroud associated with the detection manifold. The slits or apertures 36 in standoffs 34, enable the heated, pressurized gases to migrate along the length of the "air gap" between primary duct member 14 and shroud 24. Typically, the pressure in the "air gap" prior to the occurrence of a breach will be substantially less than the pressure within the primary duct member, and so, upon breach, the heated, pressurized gases will be prompted to disperse throughout the "air gap", and may be further directed to pass through one region of the "air gap", across a standoff 34, to another region of the "air gap", as a result of the nominal leakage of gases passing through the detection manifold. In an alternative embodiment, instead of a single annular standoff member, a plurality of discrete standoff members (not shown) may be arranged around the circumference of the primary duct member, with arcuately spaced gaps disposed therebetween, in lieu of a more or less continuous single standoff member with a slit therein.

In applications in which duct section 10 is to be curved, standoff members 34 would also be placed at one or more suitable locations (e.g., at the arc midpoint) along the bends, to provide support for the shroud and maintain spacing between the shroud and the underlying primary duct member.

Figure 4:
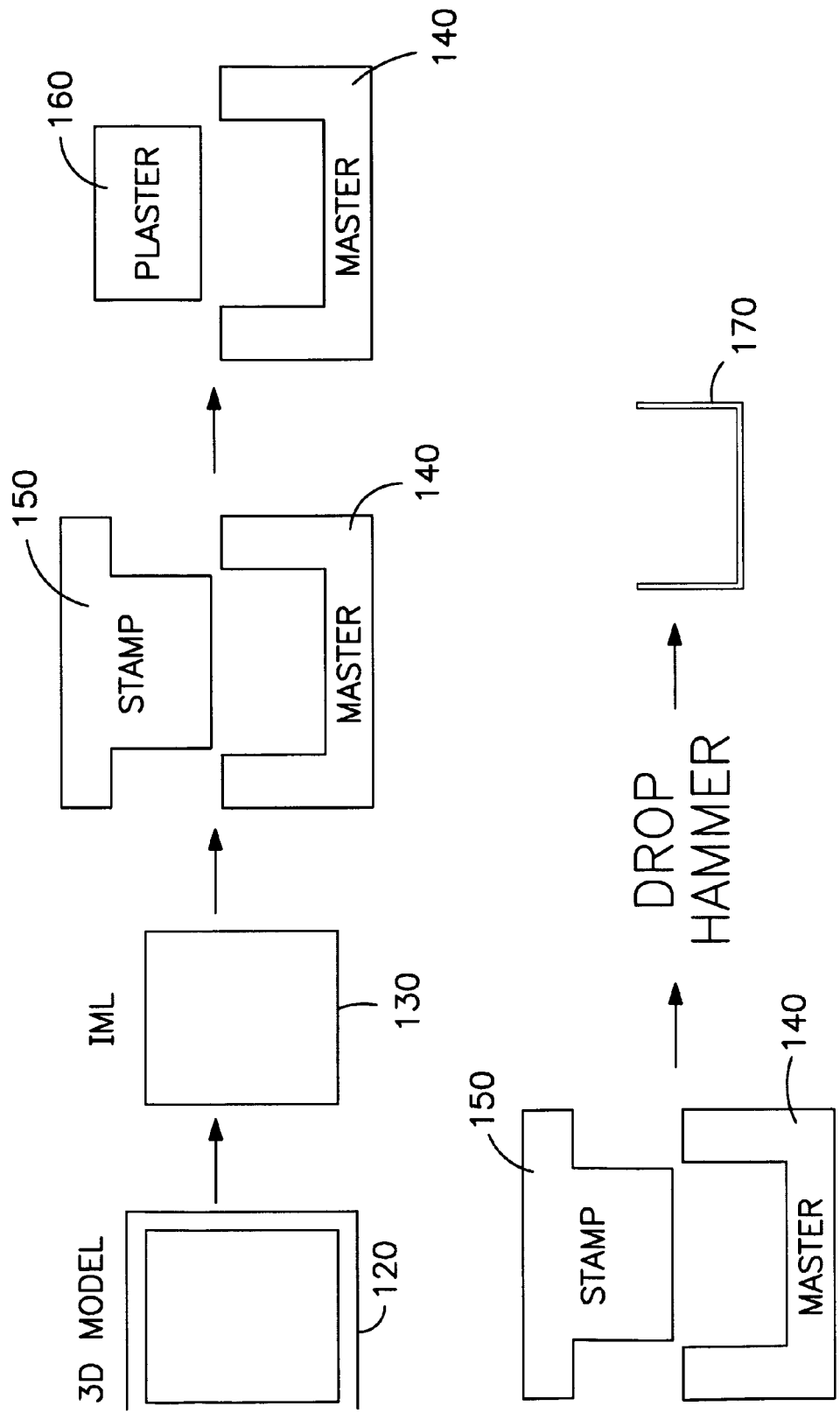
FIG. 4. is a schematic flowchart illustrating the steps in the process of forming the metallic "halves" or "skins" of the shroud structure, according to an embodiment of the invention.
Figure 5:
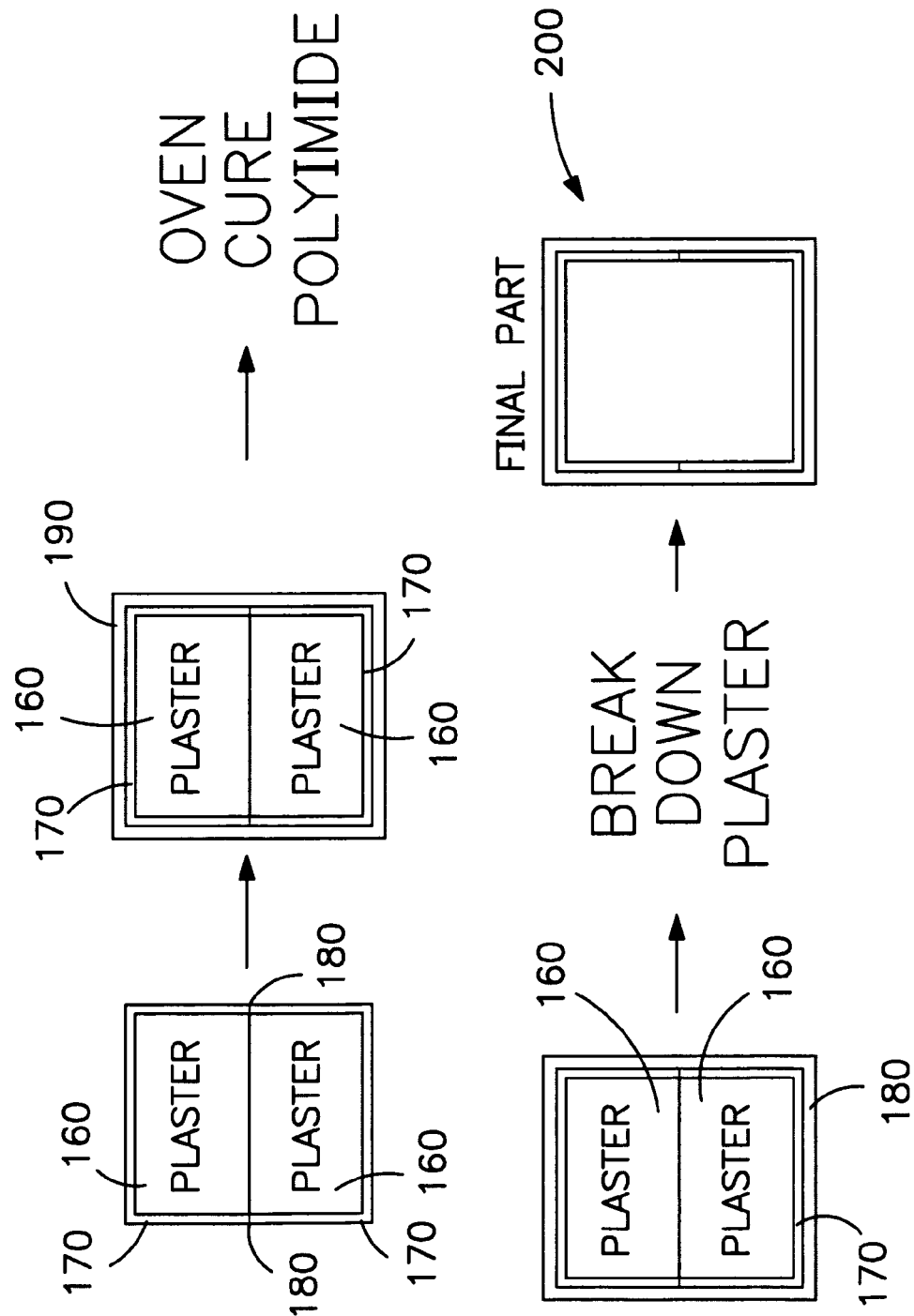
FIG. 5 is a schematic flowchart illustrating the process of assembling metallic "halves" or "skins" of the shroud structure, according to an embodiment of the invention, and subsequently forming the external polymer layer thereon.

A salient feature of the present invention is in the provision of the shroud. Instead of simply wrapping the primary duct member with a "blanket" of, for example, E-felt and silicone rubber, shroud 24/24' provides a laminated structure which provides both insulation as well as substantial structural support. FIGS. 4 and 5 herein illustrate one method for fabricating a shroud, according to one embodiment of the invention.

Referring to FIG. 4, in accordance with an embodiment of the invention, the shroud may be formed by first creating a computerized three-dimensional ("3D") image 120 of the duct, using known computer-aided design ("CAD") techniques. The 3D image is used to, in turn, determine the inner mold line or inner surface contours ("IML") (collectively, reference numeral 130) of the upper and lower portions (alternatively known as "skins", or "halves", although not necessarily literally so) of the shroud, which is then used to create master stamping molds (e.g., mold 140) for each of the upper and lower portions of the shroud. Although in the schematic illustrations of FIGS. 4 and 5, the metallic inner layer portions of the shroud are shown as being highly regular, rectangular and symmetrical, in practice, the metal shroud components may typically be circular or at least arcuate in cross-section, or even asymmetrical. Typically, for each metallic portion of the shroud, usually only two parts will be required to be formed separately and then joined together.

As mentioned herein, the metallic inner layer of the shroud is preferably quite thin, e.g., preferably on the order of 0.003 in. thick, so the clearance between the outer surface of the stamp 150 and the inner surface of the molds will be of a similar dimension, though this dimension is representative, and the invention is not to be construed as being limited thereto.

The molds 140 are used not only to stamp out the actual metal portions of the shroud, but also as molds for support blocks 160, the use of which will be described in further detail hereinafter. Support blocks 160 may be fabricated from any suitable frangible material, such as plaster.

As mentioned above, the metal portion of the shroud will be very thin, and may be formed from corrosion resistant steel (CRES) or titanium (Ti), although other metals having similar performance characteristics suitable for the application may also be used. After the two metal portions (or "skins"), e.g., skins 170, have been individually stamped, they are joined together with two oppositely positioned, generally longitudinal-extending welds 180 (e.g., "pencil" welds), after the two corresponding support blocks 160 have been placed within the respective metal skins.

Support blocks 160 serve to provide support and rigidity to the metal shroud portions, during the process steps described hereinbelow. A layer 190 of polymeric material, preferably polyimide resin impregnated fiberglass cloth in either a single ply or multiple plies, in which each ply is approximately 0.010 inches thick) is applied to the outside of the metal duct and heat cured, in an appropriate atmosphere, at a sufficient temperature and for sufficient time, appropriate to the material, to ensure that the polyimide is securely bonded to the outer surfaces of the metal skins.

Preferably, the polyimide resin fiberglass cloth, in its uncured state, is cut in a desirable pattern to fit over the metallic inner layer. Multiple layers or plies of this cloth may be used for added strength or added pressure-carrying capabilities. As part of the curing process, the entire metallic/polyimide assembly is wrapped with shrink tape, shrink wrap or is vacuum-bagged to force the metallic/polyimide layers together and bond them to one another.

In an alternative method according to an alternative embodiment of the invention, shown in FIGS. 6-8 (not to scale), first, metal layer 300 is wrapped around a mandrel 302 which may be fabricated from PTFE (such as the material sold under the registered trademark Teflon®), aluminum, or other suitable material. Metal layer 300 typically will be wrapped around mandrel 302 so as to create a slight overlap. The overlapping ends may or may not be affixed to one another such as by adhesive, pencil weld, etc., as desired or dictated by the needs of the particular application. Thereafter, one (or more if desired) polymer layer(s) 304 is/are wrapped around the outer surface of metal layer 302 (FIG. 7), and the assembly is then heat-treated to cure the polymer layer(s) 304 and adhere it/them to the inner metal layer 302.

Following curing, the laminated shroud 306 is then split once longitudinally (e.g., at 308 to de-mold it from the mandrel (FIG. 8). Split 308 is also used to enable laminated shroud 306 over/around, the primary duct. The split will be sealed with a strip (e.g., 1" wide) of the same or similar polyimide material as shroud exterior layer 304. Thereafter, the assembly is subjected to another curing procedure to cure the strip, used to seal the split in the shroud, in place.

By way of example, and not to limit the scope of the invention thereto, a duct section constructed in accordance with the principles of the present invention may have a primary duct member diameter of 3 inches and a thickness of 0.016 in., with an air gap defined between the outer surface of the primary duct member and the inner surface of the shroud, of 0.28 inches, and a shroud thickness of 0.013 inches, and further with closeout collars having a thickness of 0.012 in. Such a duct could be expected to have, a slight (e.g., 8%-10%) weight increase over a conventional silicone rubber and E-felt insulated steel duct, while being capable of providing "backup" air/gas containment capability (by being able to withstand internal pressures substantially in excess of ambient), and while meeting insulation requirements, enabling potential detection of cracks in the primary duct member (if used in conjunction with a leak detection structure as discussed herein), facilitating prevention of insulation rotation, and promoting prevention of dents in the primary duct member.

In addition, because the laminated shroud structure is solidly affixed to the primary duct member via the closeout collars, rotation of the insulating and protective shroud structure, relative to the primary duct member, is inhibited.

It is further believed that duct sections constructed in accordance with the principles of the present invention may be of a similar or comparable cost to similarly-dimensioned conventionally constructed insulated ducts. Also, because of the materials used, the duct section construction of the present invention is believed to be able to meet and surpass relevant Federal Aviation Regulation requirements regarding flammability.

The duct section of the present invention may also be used in association with a duct leak detection system, for example, of the type shown and discussed in Fernandes et al., U.S. Pat. No. 7,155,961 B2, the complete disclosure of which is hereby expressly incorporated by reference as if fully set forth herein. In such an alternative construction, in selected ones of the duct sections of the present invention, gaps could be provided in the shroud to accommodate the placement of a cuff 10, for placement of a leak gas manifold 30, such as shown and described with respect to FIG. 6 of Fernandes et al., U.S. Pat. No. 7,155,961 B2, to collect and direct any gases leaking from a breach in primary duct member 14, through the manifold 30, to leak detection wires 6. Mounting and affixation of the cuff 10 could be accomplished through the methods described in Fernandes et al., U.S. Pat. No. 7,155,961 B2. It is to be understood that the leak detection system of Fernandes et al., U.S. Pat. No. 7,155,961 B2 is described herein by way of example, and that other leak detection arrangements may be employed with the duct section structure of the present invention, without departing from the scope of the invention.

The foregoing description and drawings merely explain and illustrate the invention, and the invention is not limited thereto, except as those skilled in the art who have the present disclosure before them will be able to make modifications and variations therein without departing from the scope of the invention.

What is claimed is:

1. A duct section, for conducting gaseous fluid from a first location to a second location, the duct section comprising:
   a primary duct member, having a first end and a second end;
   a multilayer shroud, having a first end and a second end, the multilayer shroud being positioned radially outwardly from and circumferentially surrounding at least a portion of the primary duct member, the primary duct member and the multilayer shroud defining an axially extending annular space therebetween;
   a first closeout collar, permanently and sealingly affixed to the first end of the multilayer shroud and further permanently and sealingly affixed, at least indirectly, to the first end of the primary duct member, at a position proximate the first end of the primary duct member;
   a second closeout collar, permanently and sealingly affixed to the second end of the multilayer shroud and further permanently and sealingly affixed, at least indirectly, to the second end of the primary duct member, at a position proximate the second end of the primary duct member;
   the first and second closeout collars closing off opposite ends of the axially extending annular space defined by the primary duct member and the multilayer shroud, to preclude the flow of gases therefrom said space, and to prevent rotation of the multilayer shroud relative to the primary duct member;

the shroud having an inner surface and an outer surface, with a metallic inner layer positioned at the inner surface; and a polymeric outer layer, bonded to the outer surface of the metallic inner layer.

2. The duct section according to claim 1, further comprising first and second duct end flanges affixed to the first and second ends of the primary duct member.

3. The duct section according to claim 1, wherein the primary duct member is fabricated from at least one of the following materials: corrosion resistant steel; and titanium.

4. The duct section according to claim 1, wherein the metallic inner layer of the shroud is fabricated from one of the following materials: corrosion resistant steel; and titanium.

5. The duct section according to claim 1, wherein the polymeric outer layer of the shroud is fabricated from polyimide.

6. The duct section according to claim 5, wherein the polymeric outer layer comprises at least one ply of polyimide resin impregnated fiberglass cloth.

7. A duct system for conveying gaseous fluid from a first location to a second location, comprising:
    at least two duct sections, each duct section having
    a primary duct member, having a first end and a second end;
    a multilayer shroud, having a first end and a second end, the multilayer shroud being positioned radially outwardly from and circumferentially surrounding at least a portion of the primary duct member, the primary duct member and the multilayer shroud defining an axially extending annular space therebetween;
    a first closeout collar, permanently and sealingly affixed to the first end of the multilayer shroud and further permanently and sealingly affixed, at least indirectly, to the first end of the primary duct member, at a position proximate the first end of the primary duct member;
    a second closeout collar, permanently and sealingly affixed to the second end of the multilayer shroud and further permanently and sealingly affixed, at least indirectly, to the second end of the primary duct member, at a position proximate the second end of the primary duct member;
    the first and second closeout collars closing off opposite ends of the axially extending annular space defined by the primary duct member and the multilayer shroud, to preclude the flow of gases therefrom said space, and to prevent rotation of the multilayer shroud relative to the primary duct member;
    the shroud having an inner surface and an outer surface, with a metallic inner layer positioned at the inner surface; and
    a polymeric outer layer, bonded to the outer surface of the metallic inner layer; and
    first and second duct end flanges affixed to the first and second ends of the primary duct member;
    the first and second duct sections being disposed in abutting relationship to one another with a duct end flange of one of the at least two duct sections abutting a duct end flange of another of the at least two duct sections;
    a clamp, engaging the abutting duct end flanges, and affixed thereto, to form a coupling between the one and the another of the at least two duct sections.

8. The duct system according to claim 7, further comprising:
    a coupling cover positioned around the coupling between the one and the another of the at least two duct sections, and affixed to outer surfaces of the shrouds of the one and the another of the at least two duct sections.

9. The duct section according to claim 1, further comprising:
    at least one standoff member disposed between the inner surface of the shroud and the primary duct member, and affixed to the shroud member and the primary duct member, at a position between the first and second ends of each of the primary duct member and the shroud.

10. The duct section according to claim 9, wherein the at least one standoff member circumferentially encircles the primary duct member.

11. The duct section according to claim 9, wherein the at least one standoff member has an aperture disposed therein to enable the passage of gaseous fluid therethrough.

* * * * *